(12) United States Patent
Pallonen

(10) Patent No.: US 6,850,761 B2
(45) Date of Patent: *Feb. 1, 2005

(54) METHOD FOR DETERMINING THE POSITION OF A MOBILE STATION

(75) Inventor: Jorma Pallonen, Helsinki (FI)

(73) Assignee: Nokia Corporation, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 9 days.

This patent is subject to a terminal disclaimer.

(21) Appl. No.: 09/194,297
(22) PCT Filed: May 26, 1997
(86) PCT No.: PCT/FI97/00318
   § 371 (c)(1),
   (2), (4) Date: Nov. 23, 1998
(87) PCT Pub. No.: WO97/46034
   PCT Pub. Date: Dec. 4, 1997

(65) Prior Publication Data
US 2002/0002066 A1 Jan. 3, 2002

(30) Foreign Application Priority Data
May 27, 1996 (FI) .................................................. 962215

(51) Int. Cl.[7] .............................................. H04Q 7/20
(52) U.S. Cl. ..................... 455/437; 455/440; 455/456
(58) Field of Search ............................... 455/562, 67.1, 455/63, 452, 62, 67.3, 436, 438, 439, 440, 441, 453, 446, 509, 513, 456, 457, 435, 574, 550, 56.1; 342/457, 450, 453

(56) References Cited

U.S. PATENT DOCUMENTS

| 4,163,978 | A | | 8/1979 | Shepherd et al. |
| 5,394,158 | A | | 2/1995 | Chia |
| 5,418,843 | A | * | 5/1995 | Stjernholm ................. 379/112 |
| 5,432,842 | A | * | 7/1995 | Kinoshita et al. ........... 455/440 |
| 5,508,707 | A | | 4/1996 | LeBlanc et al. |
| 5,515,419 | A | | 5/1996 | Sheffer |
| 5,612,703 | A | * | 3/1997 | Mallinckrodt ............... 342/457 |

(List continued on next page.)

FOREIGN PATENT DOCUMENTS

| EP | 0 320 913 | 6/1989 |
| EP | 0 431 956 | 6/1991 |
| EP | 0 631 453 | 12/1994 |
| GB | 2 224 409 | 5/1990 |
| GB | 2 243 041 | 10/1991 |
| GB | 2 253 758 | 9/1992 |
| WO | WO 96/07108 | 3/1996 |

OTHER PUBLICATIONS

A copy of the International Search Report for PCT/FI97/00318.

Primary Examiner—Pablo N. Tran
(74) Attorney, Agent, or Firm—Squire, Sanders & Dempsey L.L.P.

(57) ABSTRACT

The present invention relates to a base station of a cellular radio system, which base station comprises antenna equipment for receiving signals from a certain mobile station simultaneously by at least two antenna beams directed in different directions, and measuring equipment for measuring the signal levels of the signals received by the respective antenna beans. For determining the position of the mobile station with greater accuracy the base station is provided with calculating means which are responsive to the measuring equipment to determine the direction from the base station to the mobile station by calculating the relations between the signal levels of the signals for the respective beams.

8 Claims, 3 Drawing Sheets

U.S. PATENT DOCUMENTS

| | | | | |
|---|---|---|---|---|
| 5,657,487 A | * | 8/1997 | Doner | 455/456 |
| 5,884,147 A | * | 3/1999 | Reudink et al. | 455/67.1 |
| 5,884,164 A | * | 3/1999 | Gerard et al. | 455/428 |
| 5,893,033 A | * | 4/1999 | Keskitalo et al. | 455/437 |
| 5,966,670 A | * | 10/1999 | Keskitalo et al. | 455/562 |
| 5,970,413 A | * | 10/1999 | Gilhousen | 455/456 |
| 6,021,329 A | * | 2/2000 | Kornestedt et al. | 455/446 |
| 6,034,635 A | * | 3/2000 | Gilhousen | 342/457 |
| 6,049,718 A | * | 4/2000 | Steward | 455/456 |
| 6,061,337 A | * | 5/2000 | Light et al. | 370/331 |
| 6,061,564 A | * | 5/2000 | Akeda | 455/435 |
| 6,075,993 A | * | 6/2000 | Kawamoto | 455/456 |
| 6,108,556 A | * | 8/2000 | Ito | 455/456 |
| 6,122,260 A | * | 9/2000 | Liu et al. | 370/280 |

* cited by examiner

METHOD FOR DETERMINING THE POSITION OF A MOBILE STATION

FIELD OF THE INVENTION

The invention relates to a method for determining the position of a mobile station located in the coverage area of a base station in a radio system, in which method the base station comprises equipment for receiving signals from the same mobile station simultaneously by at least two antenna beams directed in different directions, and in which method: the signal levels of the signals received by the different antenna beams are measured, the signal levels of the signals received from the same mobile station by the different antenna beams are compared, and the direction to the mobile station in relation to the base station is determined on the basis of the relations between the signal levels measured for the different antenna beams. The invention further relates to a base station of a radio system, which base station comprises antenna equipment for receiving signals from a certain mobile station simultaneously by at least two antenna beams directed in different directions, measuring equipment for measuring the signal levels of the signals received by the different antenna beams, calculation means which are responsive to the measuring equipment for determining the direction from the base station to the mobile station on the basis of the relations of the signal levels measured for the different antenna beams, and equipment for defining a timing advance for the mobile station, which is in radio connection with the base station, to compensate for a time lag caused by the distance between the mobile station and the base station.

By the notion antenna beams turned in different directions is here meant that the radio cell covered by the base station is divided into adjacent sectors from which signals related to the same logical channel (the same frequency channel and time slot) are received, and that a directional antenna or the equivalent is directed to each sector, by which antenna signals can be received from the sector in question. The antennas of the base station are, however, preferably directed so that they overlap at least partly in the border zones between them.

The invention relates to determining of the position of a mobile station in a cellular radio system, e.g. the GSM system (Groupe Special Mobile). Prior solutions are known where the position of the mobile station has, for example, been determined by checking from the home location register (HLR) of the mobile switching centre of the GSM-system in which radio cell the mobile station is located at a certain moment. The most significant problem with this known solution is its inaccuracy. Since it can only be ascertained in which radio cell the mobile station is located in the known solutions mentioned before, the accuracy of determining the position, of course, directly depends on the size of the radio cell in question. The size of the radio cells again totally depends on the properties of the radio system, but in the GSM system, for example, the inaccuracy of determining the position according to the radio cell can typically be several kilometers.

However, in practice there has been a need for greater accuracy in determining the position of a mobile station. For example in connection with handover operations it would be necessary to determine the exact geographical position of the mobile station. At present handover is, for instance in the GSM system, based on the signal level and quality of the signals received, and by no means on the position of the mobile station. Thus temporary radio disturbances can lead to an unnecessary handover operation, i.e. the mobile station is transferred from one cell to another when the signal level or quality falls below a predetermined level, after which the handover operation is repeated but in the reverse direction, i.e. the mobile station is returned to the original cell when the disturbance is over Another situation where it would be necessary to determine the exact position of the mobile station is when a stolen mobile station or for example a SIM Card (Subscriber Identity Module) is to be located. In known solutions, where the inaccuracy in locating the mobile station is several kilometers, it is practically impossible to determine the position of a stolen mobile station.

SUMMARY OF THE INVENTION

The object of the present invention is to solve the above mentioned problems and to achieve a more precise method for determining the position of a mobile station. This aim is achieved by the method of the invention, which is characterized in calculating the distance from the mobile station to the base station on the basis of a timing advance given to the mobile station by the base station and the propagation speed of the radio signals.

The invention also relates to a base station by which the method of the invention can be carried out. A base station according to the invention is characterized in that the calculation means comprise equipment for calculating the distance between the base station and the mobile station on the basis of the timing advance defined for the mobile station and the propagation speed of the radio signals.

The invention is based on the realization that the position of the mobile station can be determined with significantly greater accuracy than in known solutions when its signals are received by at least two antenna beams directed in different directions and when the audibility of the signals received by the respective beams from the mobile station is compared. In other words, the audibility of the signals transmitted by the mobile station is normally best for the beam that is directed straight towards the mobile station. Thus it can be determined within which beam the mobile station is located. When it is further known in which direction the beam in question is turned the direction to the mobile station can easily be determined. How near the centre or respectively the edges of the beam the mobile station is located can be determined by comparing the signal levels of the signals received by the beam in question to the signal levels of the signals received by "the principal beam". Thus the direction from the base station to the mobile station can be determined from the relation between the signal levels of the signals received by the respective beams. In addition to this the distance from the mobile station to the base station can, according to the invention, be calculated on the basis of a timing advance given to the mobile station by the base station and the propagation speed of the radio signals. In the GSM system, for example, there is already in use a so called timing advance TA given by the base station to the mobile station to inform it of how much in advance it should transmit its signals so that the signals will arrive at the right moment and in the proper time slot to the base station regardless of the distance between the mobile station and the base station. Thus, the distance between the base station and the mobile station can be determined on the basis of the timing advance when the propagation speed of the signals is known.

The most significant advantage with the solution of the invention is thus that the position of the mobile station, that is both its direction and distance from the base station, can be determined with significantly greater accuracy than previously, which among other things makes it possible to make handover decisions on the basis of the location of the mobile station, whereby unnecessary handover operations can be avoided, and for example to locate a stolen mobile station with greater accuracy than before.

So that temporary disturbances would not significantly disturb the determining of the position of the mobile station, in a preferred embodiment of the invention the mean value of the signal levels of the signals received by the respective antennas from a certain mobile station is calculated for a certain time period, whereby the position of the mobile station is determined on the basis of the mean values of the calculated relations.

BRIEF DESCRIPTION OF THE DRAWINGS

The preferred embodiments of the method and base station of the invention are revealed in the attached dependent claims 2–4 and 6–8.

In the following the invention will be described in more detail in a few preferred embodiments by mean of the attached drawings, in which.

DETAILED DESCRIPTION OF THE INVENTION

Figure 1:
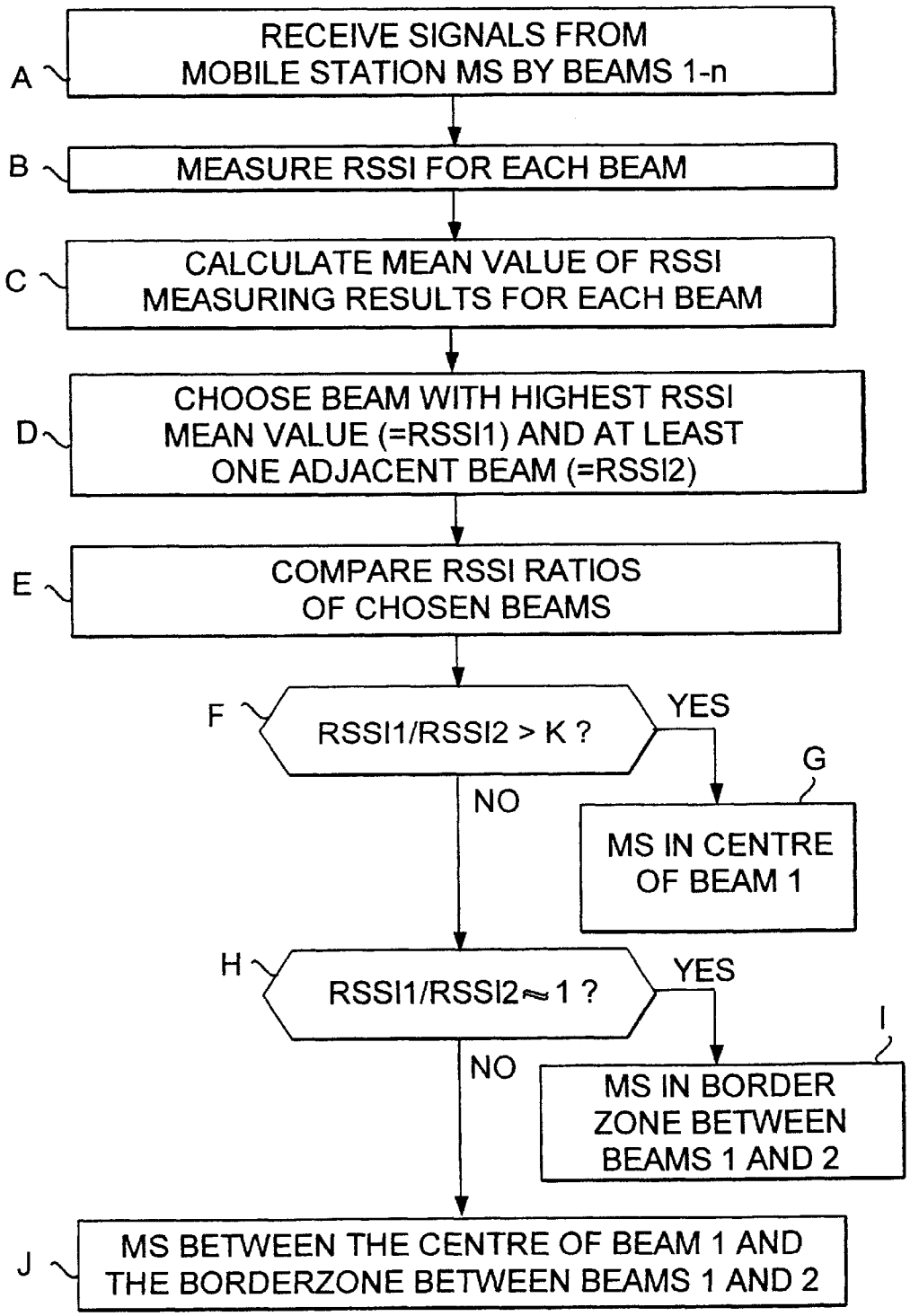
FIG. 1 shows a flowchart of a first preferred embodiment of the method of the invention.

FIG. 1 shows a block diagram of a first preferred embodiment of the method of the invention. The block diagram in FIG. 1 can, for example, be applied in a base station of the GSM system to determine the position of a mobile station.

In block A signals are received from a mobile station MS by several antenna beams directed in different directions. The antenna beams used are preferably relatively narrow beams that are directed so that they at least partly overlap (compare with FIG. 2).

In block B the received signal strength indication RSSI of the received signal is measured for the signals received by the respective beams.

In block C a mean value is calculated for the RSSI values measured within a certain time span for each beam. By calculating the mean value for the RSSI values it can be avoided that temporary disturbances influence the locating of the mobile station. For example in the GSM system the time span in question can be chosen so that the mean value is calculated for a few bursts received from the mobile station.

In block D a first beam is chosen which has the highest RSSI mean value (=RSSI1). In addition to this at least one of the adjacent beams is chosen as a second beam, whereby preferably the beam with the higher RSSI mean value (=RSSI2) is chosen.

In block E the RSSI values for the different beams are compared by calculating the ratio of the RSSI mean values RSSI1/RSSI2 for the chosen beams.

In block F it is checked if the RSSI ratio for the beams is greater than the predetermined reference value K. The reference value is chosen so that it is essentially greater than 1. If the RSSI ratio exceeds the reference value that denotes that the audibility of the mobile station is much better by the first chosen beam than by the second chosen beam, which means that the mobile station is located in the direction of the centre of the first beam. Hereby a transfer is made to block G, where the direction of the first chosen beam is specified, which is the direction where the mobile station is located.

In block H it is checked if the RSSI ratio is nearly 1. If that is the case it denotes that the audibility of the mobile station is almost equally good via both the chosen beams. This again means that the mobile station is located in the border zone between the two beams. Hereby a transfer is made to block I, where the direction is specified where the border zone between the beams (and the mobile station) is located.

Provided that the RSSI ratio of the beams is not greater than the reference value K, neither the RSSI ratio nearly 1, a transfer is made to block J. Thus it is ascertained that the audibility of the mobile station is somewhat better via the first chosen beam than via the second chosen beam, which means that the mobile station is located between the centre of the first chosen beam and the border zone between the chosen beams. If it is necessary to determine the direction to the mobile station more accurately than that, the direction in question can be determined by the RSSI ratio of the beams. That requires measurements made in advance so that a precise picture can be had of how the RSSI ratio between the beams changes when the mobile station moves from the border zone between the beams to the centre of the first beam.

By following the flowchart in FIG. 1 only the direction from the base station to the mobile station can be determined. In addition to this it can be necessary also to determine the distance from the base station to the mobile station. According to the invention the distance in question can be calculated on the basis of the timing advance given to the mobile station by the base station, that is distance=timing advance*propagation speed of the radio signals How accurately the position of the mobile station can be determined in relation to the base station of course depends on the width of the antenna beams used and how accurately the base station calculates the timing advance for the mobile station. For example in the GSM system the position of the mobile station can be determined as described above with an accuracy of typically about 0.5×0.5 km, when the width of the antenna beams is about 30°.

Figure 2:
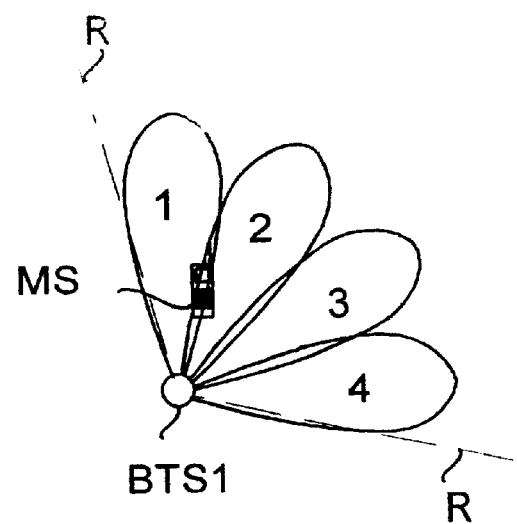
FIG. 2 illustrates a first preferred embodiment of a base station of the invention.

FIG. 2 illustrates a first embodiment of a base station of the invention. The base station BTS1 in FIG. 2 can, for example, be a base station in the GSM system, which base station comprises equipment for receiving signals transmitted by the mobile station MS from the radio cell in the figure simultaneously by four receiving beams 1–4. In FIG. 2 the boundaries of the radio cell have been illustrated by a dash line R.

The mobile station MS of FIG. 2 is located in the border zone between beams 1 and 2, whereby its audibility is almost as good by beam 1 as by beam 2. That is the RSSI ratio for beams 1 and 2 calculated by the base station BTS1 is nearly 1.

Figure 3:
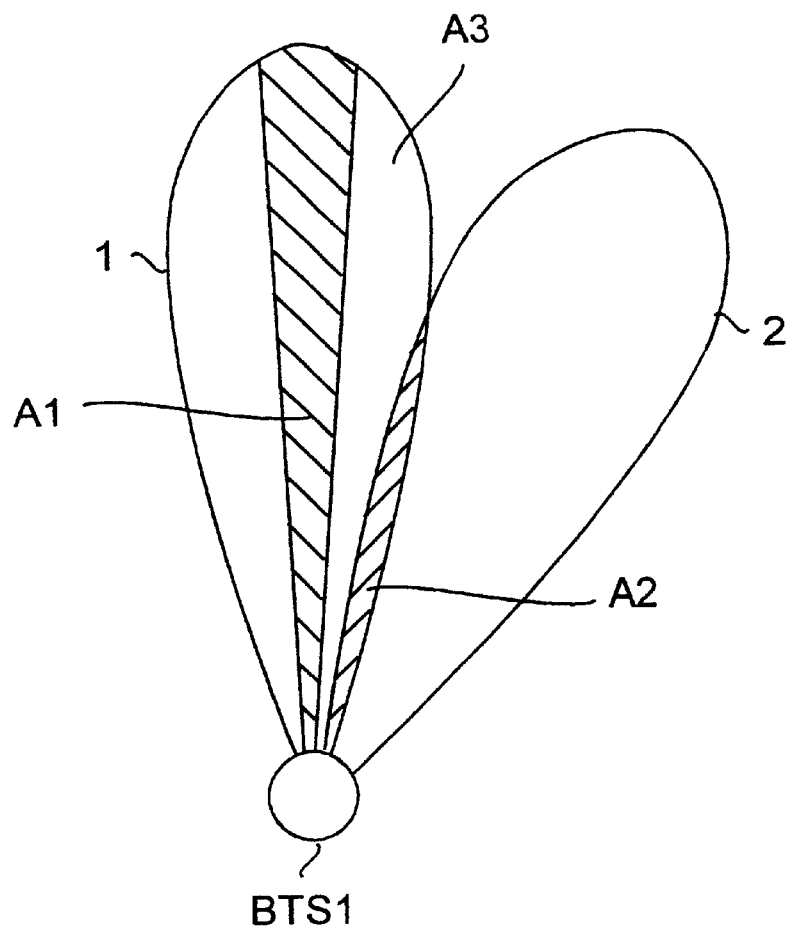
FIG. 3 shows an enlargement of the receiving beams of the base station in FIG. 2.

FIG. 3 shows an enlargement of the receiving beams 1 and 2 of the base station in FIG. 3. It is assumed that the base station BTS1 has received the signals with greater signal strength via beam 1. In that case the mobile station that has transmitted the signals in question is located in the area covered by beam 1. If the mobile station is located in the centre of beam 1, that is in the striped area A1 in FIG. 3, the base station will recognize that as the calculated RSSI values for beam 1 are considerably greater than those for beam 2. That is the RSSI ratio is essentially greater than 1.

If the mobile station is located in the border zone A2 between the beams the base station will recognize that as the RSSI values calculated for beams 1 and 2 are essentially as great, that is the RSSI ratio is nearly 1.

If the mobile station is located between the centre A1 of beam 1 and the border area between beams 1 and 2, that is in the area A3, the base station will recognize that as the RSSI values measured for beam 1 are somewhat greater than the RSSI values measured for beam 2.

Figure 4:
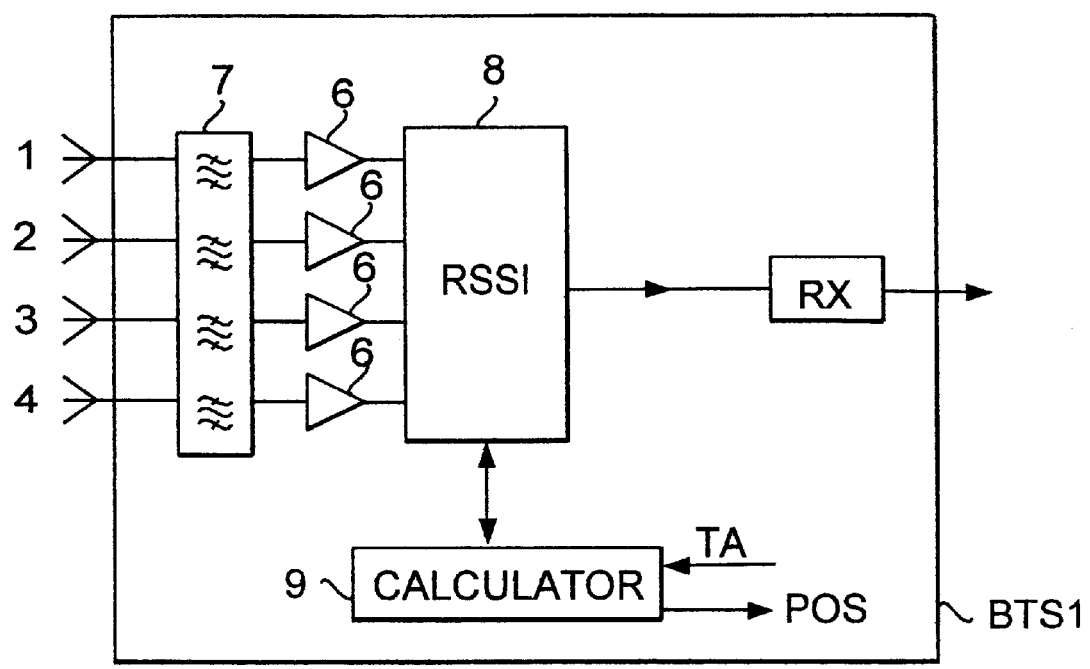
FIG. 4 shows a block diagram of the base station in FIG. 2.

FIG. 4 shows a block diagram of the base station in FIG. 2. The signals related to the same logical channel that are received by the base station BTS1 by the antenna beams 1–4 are fed through band-pass filters 7 and amplifiers 6 to the RSSI receiver 8 of the base station. In FIG. 4 the RSSI receiver 8 is shown in connection with the base station, but to facilitate cabling the RSSI receiver can also be arranged in connection with an antenna element in the antenna mast of the base station.

In the example in FIG. 4 there are 4 inputs and one output. The RSSI receiver chooses one of the signals fed into its inputs for further transmission via its output to the receiver RX of the base station. In the base station in FIG. 4 the RSSI receiver 8 chooses a signal for further transmission by measuring the signal level RSSI for the signals received by each antenna beam 1–4 and by choosing the beam for which the greatest RSSI value has been measured. Alternately the RSSI receiver can choose the beam also in some other way, by also including a value representing signal quality like the bit error ratio BER in addition to the RSSI value. A solution like that will, however, complicate the construction of the RSSI receiver.

If such a receiver is used that can manage diversity reception, the RSSI receiver can have two outputs, whereupon the RSSI receiver chooses the two best antenna beams for use and transmits the signals received by these further to the actual receiver of the base station. With an arrangement like this an improvement of about 3 dB can be achieved in the reception of signals from a mobile station in the border zone between the sectors.

According to the invention the RSSI receiver 8 feeds the RSSI values measured for the respective beams to the calculator 9. The calculator 9 can for example be a processor and a computer program added to the base station for locating the mobile station.

The calculator 9 calculates the mean value of the received signals for each antenna beam on the basis of the measuring results. Since the base station in FIG. 4 is a base station of the GSM system, where the frequency channels have been divided into time slots according to the TDMA principle, the calculator 9 first calculates a mean value for each antenna beam separately for each logical channel. After this the calculator specifies the direction from the base station to the mobile station as shown in the flowchart in FIG. 1.

A signal denoting the timing advance TA given to the mobile station by the base station is according to the invention also fed to the calculator 9. On the basis of this signal the calculator calculates the distance to the mobile station as described in connection with the flowchart in FIG. 1.

The signal POS fed from the output of the calculator thus denotes the position of the mobile station in relation to the base station (direction+distance). For instance handover operations can be timed better on the basis of this information, since they are then based on information about the position of the mobile station. Additionally the information about the position of the mobile station can be transmitted further via the base station controller and the mobile switching centre to the network management centre, whereupon the operator can determine the position of the mobile station with even greater accuracy from the network management centre.

It is to be understood that the above description and the related drawings are only intended to illustrate the present invention. Thus the invention can also be applied in other cellular radio systems than the GSM system. To those skilled in the art various other modifications and variations of the invention will be apparent within the scope and spirit of the present invention disclosed in the attached claims.

What is claimed is:

1. A method for determining the position of a mobile station located in a coverage area of a base station in a radio system and for using location information, in which method the base station comprises equipment for receiving signals from the same mobile station simultaneously by at least two antenna beams directed in different directions, the method comprising:

measuring signal levels of signals received from a same mobile station by different antenna beams of said base station, comparing the signal levels of the signals received from the same mobile station by the different antenna beams, determining a direction to the mobile station in relation to the bas station on the basis of a relations between the signal levels measured for the different antenna beams, and calculating a distance from the mobile station to the base station on the basis of a timing advance, given to the mobile station by the base station and propagation speed of the radio signals, wherein said distance and said direction is used for making a decision whether or not said mobile station should be transferred to another base station by a handover.

2. A method according to claim 1, wherein calculating a mean value for the measuring results during a determined time period and determining the direction to the mobile station on the basis of the relations between the calculated mean values.

3. A method according to claim 1, wherein choosing a beam by which signals with the strongest signal level have been received and at least one of the adjacent beams (D), comparing the measured signal levels for the antenna beams, and determining the direction to the mobile station on the basis of the relation between the signal levels for the chosen antenna beams.

4. A method according to claim 1, wherein determining that the mobile station is located in the centre of the first chosen beam, if signal level (RSSI1) of the signals received by the beam is essentially higher than a signal level (RSSI2) of the signals received by the other chosen antenna beam, in a border area between the antenna beams, if the signal level (RSSI1, RSSI2) of the signals received by the chosen antenna beams are substantially the same, and between the centre of the first chosen antenna beam and the border zone of the beams, if the signal level (RSSI1) of the signals received by the first antenna beam is somewhat higher than the signal level (RSSI2) of the signals received by the other antenna beam.

5. Base station (BTS1) of a radio system, which base station comprises:
- antenna equipment for receiving signals from a certain mobile station simultaneously by at least two antenna beams directed in different directions,
- measuring equipment for measuring the signal levels of the signal received by the different antenna beams,
- equipment for defining a timing advance for the mobile station which is in radio connection with the base station to compensate for a time lag caused by the distance between the mobile station and the base station, and
- calculation means which are responsive to the measuring equipment for determining the direction from the base station to the mobile station on the basis of the relations of the signal levels measured for the different antenna beams, and which calculation means comprise equipment for calculating the distance between the base station and the mobile station on the basis of the timing advance defined for the mobile station and the propagation speed of the radio signals,
- wherein said calculation means are adapted to transmit said direction and said distance further in the system in order to be used for making a decision whether or not said mobile station should be transferred to another base station by a handover.

6. Base station according to claim 5, wherein that the calculation means are arranged for calculating for each beam the mean value of the signal levels of the signals received from the mobile station by the respective antenna beams, whereby the calculation means are arranged to determine the direction from the base station to the mobile station on the basis of relations between the calculated mean values.

7. Base station according to claim 5, in wherein that the calculation means include means for choosing the antenna beam (1) with the strongest signal level and at least one adjacent beam (2), wherein the calculating means are arranged for determining the direction from the base station to the mobile station on the basis of the relations of the signal levels (RSSI1, RSSI2) of the signals received via the chosen antenna beams (1, 2).

8. Base station according to claim 5, wherein said base station is a base station of a cellular radio system divided into logical traffic channels in accordance with a TDMA principle.

* * * * *